(12) United States Patent
Nagasawa et al.

(10) Patent No.: US 7,367,233 B2
(45) Date of Patent: May 6, 2008

(54) PRESSURE SENSOR MODULE AND PRESSURE DETECTING DEVICE

(75) Inventors: Kenji Nagasawa, Tokyo (JP); Ayumu Sakamoto, Tokyo (JP); Takahiro Shimada, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 11/569,915

(22) PCT Filed: Jun. 1, 2005

(86) PCT No.: PCT/JP2005/010022

§ 371 (c)(1),
(2), (4) Date: Dec. 1, 2006

(87) PCT Pub. No.: WO2005/119194

PCT Pub. Date: Dec. 15, 2005

(65) Prior Publication Data
US 2007/0227254 A1 Oct. 4, 2007

(30) Foreign Application Priority Data
Jun. 3, 2004 (JP) ............................. 2004-166104

(51) Int. Cl.
*G01L 7/08* (2006.01)
(52) U.S. Cl. .................................................... 73/715
(58) Field of Classification Search ............... 73/718, 73/715, 717, 720
See application file for complete search history.

(56) References Cited

U.S. PATENT DOCUMENTS

| 3,618,390 A | * | 11/1971 | Frick | .......................... | 73/718 |
| 4,120,206 A | * | 10/1978 | Rud, Jr. | ....................... | 73/718 |

FOREIGN PATENT DOCUMENTS

| JP | 2552093 | 8/1996 |
| JP | 8-313379 | 11/1996 |
| JP | 2846869 | 10/1998 |
| JP | 3323513 | 6/2002 |
| JP | 3410568 | 3/2003 |
| JP | 3410711 | 3/2003 |

* cited by examiner

*Primary Examiner*—Jewel Thompson
(74) *Attorney, Agent, or Firm*—Rankin, Hill & Clark LLP

(57) ABSTRACT

A pressure sensor module 2, wherein a holding space 34 is formed between a diaphragm 22 and a thin film layer 31, and a vent hole 321 communicating with the exterior of a first case is provided in the holding space 34. In the above pressure sensor module, even when a corrosive gas or chemical solution is used as a fluid to be measured and a corrosive gas component originated from the fluid to be measured permeates into the holding space 34, the permeated corrosive gas component can be discharged to the outside of the case through the vent hole 321. As a result, the corrosion of the diaphragm 22 by the fluid to be measured can be prevented, which results in the achievement of a prolonged service life of the pressure sensor module 2.

20 Claims, 12 Drawing Sheets

PRESSURE SENSOR MODULE AND PRESSURE DETECTING DEVICE

TECHNICAL FIELD

The present invention relates to a pressure sensor module and a pressure detecting device for detecting a pressure of a fluid to be measured.

BACKGROUND ART

Conventionally, there have been a pressure transmitter, a pressure measuring device, etc. used for a pipeline for highly corrosive gas, chemical solution or the like. Such pressure transmitter, pressure detecting device, etc. are provided with a pressure sensor module that contacts the highly corrosive gas, chemical solution or the like to detect its pressure (refer to, for example, Patent Document 1 and Patent Document 2).

In a pressure sensor module according to Patent Document 1, a pressure guide member made of PFA (PerFluoro-Alkoxylalkane) is fitted on an opening side of a diaphragm pressure sensor. A pressure frame also made of PFA is welded to the pressure guide member, and a diaphragm is bonded onto an inner surface of the pressure frame. A pressure sensor is provided on an inner surface of the diaphragm to convert a displacement of the diaphragm, which is generated by the pressure of the gas, chemical solution or the like as a fluid to be measured, into a variation in resistance and output the variation as an electronic signal. Herein, the surface of the diaphragm is coated with PFA resin in order to be protected against corrosion caused by the highly corrosive gas, chemical solution or the like.

In a pressure sensor module according to Patent Document 2, a flexible film is provided on a lip of a cavity, and a pressure sensor is provided on the top of the flexible film. The flexible film is displaced due to the pressure of a fluid to be measured, and the displacement of the flexible film is detected by the pressure sensor, so that the pressure of the fluid to be measured is measured. The flexible film is made of, for example, Teflon (the registered trademark of E. I. Du Pont de Numours and Company). A pattern of grooves or channels is formed on the flexible film, and pinhole paths are left in the flexible film. Further, a relieving passage into a central region of the cavity is formed from the side of a surface of the flexible film opposite to a surface of pressure sensor.

[Patent Document 1] Japanese Patent No. 3410711 (Page 2, FIG. 1)

[Patent Document 2] Japanese Patent No. 3323513 (Page 6, FIGS. 4 to 15)

DISCLOSURE OF THE INVENTION

Problems to be Solved by the Invention

In the diaphragm pressure sensor described in Patent Document 1, the PFA-made pressure frame and the diaphragm of the pressure sensor are bonded to each other with an adhesive. However, with such an arrangement, there is concern that a corrosive gas component originated from the fluid to be measured may permeate the diaphragm. In this situation, the diaphragm will be corroded, or the pressure frame bonded into the diaphragm will be separated away from the diaphragm. Thus, due to its limited service life, the pressure sensor can not be used for long time.

In the pressure sensor module described in Patent Document 2, the thin flexible film made of Teflon (the registered trademark of E. I. Du Pont de Numours and Company) is press-fitted onto the pressure sensor. However, with such an arrangement, similar to the circumstance described in Patent Document 1, there is concern that the corrosive gas component originated from the fluid to be measured may permeate the pressure sensor. Particularly, when the corrosive gas component originated from the fluid to be measured permeates the flexible film due to long time use, the pressure sensor will be corroded by the permeated gas component, which may cause the damage of the pressure sensor.

An object of the present invention is to provide a pressure sensor module and a pressure detecting device having long lifetime in which measurement accuracy can be maintained even for long time use.

MEANS FOR SOLVING THE PROBLEMS

A pressure sensor module according to an aspect of the present invention includes a thin plate-like diaphragm displaceable by a pressure of a fluid to be measured; a detector provided on the diaphragm and adapted to detect the displacement of the diaphragm; a thin film layer displaceable by the pressure of the fluid to be measured, the thin film layer being arranged facing, through a holding space formed by a holder, a surface of the diaphragm opposite to a detector side of the diaphragm; a displacement transmitter for transmitting a displacement of the thin film layer to the diaphragm; and a vent hole that allows the holding space to communicate with the outer space.

In the above arrangement, the holding space is formed between the diaphragm and the thin film layer, and the vent hole that allows the holding space to communicate with the outer space is provided. With the above arrangement, even when the corrosive gas component originated from the fluid to be measured, for example, permeates the thin film layer, the permeated corrosive gas component can be discharged or diluted through the vent hole formed in the holding space. Thus, since the diaphragm will not be corroded by the corrosive gas or chemical solution even for long time use, the measurement accuracy can be maintained, and the service life of the pressure sensor module can be prolonged.

According to another aspect of the present invention, it is preferred that the holder is a circular member formed on outer peripheries of the diaphragm and of the thin film layer.

In the above arrangement, the circular member is formed between the outer periphery of the diaphragm and the outer periphery of the thin film layer, so that the holding space is formed. Thus, the holding space having the same height of that of the circular member can be securely formed. Further, since the circular member is bonded to the outer periphery of the diaphragm and the outer periphery of the thin film layer, the pressure of the fluid to be measured can be received by entire inner portion of the thin film layer inside the circular member. Thus, the pressure detecting accuracy of the pressure sensor module can be improved.

According to another aspect of the present invention, it is preferred that the vent hole includes a plurality of the vent holes formed in the circular member.

In the above arrangement, the holding space is provided with a plurality of the vent holes. With the above arrangement, the holding space can be ventilated to the outside of the case through the plurality of vent holes. Thus, even when the corrosive gas component originated from the fluid to be measured is permeated through the thin film layer into the holding space, the corrosive gas component originated from the fluid to be measured can be effectively discharged or diluted through the plurality of the vent holes. Further, there also can be an alternative arrangement in which, among the plurality of the vent holes, some vent holes serve as outlet vent holes for discharging the corrosive gas component originated from the fluid to be measured permeated into the holding space, and the remaining vent holes serve as inlet vent holes for actively replacing the atmosphere inside the holding space which is corrosive gas atmosphere due to the permeated corrosive gas component originated from the fluid to be measured. With this arrangement, the corrosive gas component permeated into the holding space can be forced to flow out, and the holding space can be ventilated more effectively. Thus, the diaphragm can be securely prevented from being corroded by the permeated corrosive gas component originated from the fluid to be measured.

According to another aspect of the present invention, it is preferred that the displacement transmitter is substantially aligned with the central axis of the holding space.

In the above arrangement, the displacement transmitter is substantially aligned with the central axis of the holding space. For example, when the holding space is cylinder-shaped surrounded by a circular member, the displacement transmitter is arranged concentrically to substantially the central axis of the cylinder. With the above arrangement, the displacement transmitter can transmit the displacement of substantially the center of the thin film layer, at which the displacement amount caused by the pressure of the fluid to be measured is greatest, to the diaphragm. Thus, the displacement amount of the thin film layer can be securely transmitted to the diaphragm.

Further, according to another aspect of the present invention, it is preferred that the displacement transmitter connects substantially the center of the thin film layer and substantial the center of the diaphragm.

In the above arrangement, the displacement transmitter is fixed to both the diaphragm and the thin film layer, so that the diaphragm and the thin film layer are connected via the displacement transmitter. With the above arrangement, even when the thin film layer is displaced to a direction away from the diaphragm caused by a negative pressure, or when the thin film layer is displaced only for a slight amount caused by a slight pressure, the displacement of the thin film layer can be securely transmitted to the diaphragm. Thus, the measurement accuracy for pressure of the fluid to be measured can be maintained at high level.

Further, according to another aspect of the present invention, it is preferred that the thin film layer is formed substantially into a cup-shape including a bottom portion facing the diaphragm, and a cylindrical portion extending from an outer periphery of the bottom portion toward a side opposite to the diaphragm, an outer peripheral end of the cylindrical portion being fixed to the holder.

In the above arrangement, the thin film layer is substantially cup-shaped, and the outer periphery of the cup is fixed. With the above arrangement, the stress caused by the pressure received by a surface of the thin film layer on the side opposite to the diaphragm (namely a pressure receiving surface) can be dispersed to the whole cup-shaped thin film layer, instead of being concentrated on areas around the displacement transmitter. Thus, the thin film layer can obtain sufficient pressure resistance even with a reduced thickness, and thereby the accuracy of the pressure sensor module can be improved by reducing the thickness of the thin film layer.

Further, according to another aspect of the present invention, it is preferred that the displacement transmitter projects from a substantially central position of the bottom portion toward the side of the diaphragm, the displacement transmitter being curved from a surface of the bottom portion to a tip end of the displacement transmitter.

In the above arrangement, the boundary between the thin film layer and the displacement transmitter has a curved shape.

With the above arrangement, the pressure received by the pressure receiving surface can be dispersed to the curved portion of the boundary, instead of being concentrated at one point on the boundary. Thus, the pressure resistance of the thin film layer can be further improved.

Further, according to another aspect of the present invention, it is preferred that a projection is provided on a side opposite to the side of the bottom portion on which the displacement transmitter is provided, the projection being curved from a surface of the bottom portion to the tip end of the projection.

In the above arrangement, the projection is provided on the pressure receiving surface side of the thin film layer, and the boundary between the projection and the thin film layer has a curved shape. With the above arrangement, the pressure received by the thin film layer can be dispersed to the curved portion of the projection provided on the pressure receiving surface side. Thus, the pressure received by the pressure receiving surface can be further dispersed.

Further, according to another aspect of the present invention, it is preferred that the thin film layer, the holder and the displacement transmitter are integrally molded.

With the above arrangement, since the thin film layer, the holder and the displacement transmitter are integrally molded, the number of components can be reduced, thereby simplifying the configuration. Further, separation will not occur either between the thin film layer and the displacement transmitter or between the thin film layer and the projection, and the pressure resistance can be maintained.

Further, according to another aspect of the present invention, it is preferred that the thin film layer, the circular member and the displacement transmitter are integrally molded.

With the above arrangement, since the thin film layer, the circular member and the displacement transmitter are integrally molded, the circular member and the displacement transmitter will not separate away from the thin film layer. Thus, the thin film layer, the circular member and the displacement transmitter are free from deterioration caused by separating away from each other even for long time use. Further, since the thin film layer, the circular member and the displacement transmitter are integrally molded, the work for bonding the thin film layer, the circular member and the displacement transmitter to each other is eliminated, thereby improving the productivity.

Further, according to another aspect of the present invention, it is preferred that the thin film layer is made of a fluororesin.

In the above arrangement, the thin film layer is made of a fluororesin. The fluororesin, owing to its excellent corrosion resistance, can prevent the diaphragm from being corroded even when high corrosive fluid to be measured is used. For example, when Teflon (the registered trademark of E. I. Du Pont de Numours and Company) is used as the fluororesin, the diaphragm can be securely prevented from being corroded by the fluid to be measured.

Further, according to another aspect of the present invention, it is preferred that a base is provided facing the detector side of the diaphragm; and the detector includes a capacitor formed by a pair of electrodes respectively provided on the detector side of the diaphragm, and on a surface of the base facing the diaphragm.

In the above arrangement, the pressure sensor module is provided with the base facing the diaphragm, and the detector is provided with the pair of electrodes provided on the facing surfaces of the diaphragm and the base. Thus, the capacitor is formed by the pair of electrodes, the capacitance of the capacitor varying in accordance with the displacement amount of the diaphragm. The detector can detect the pressure of the fluid to be measured by detecting the variation of the capacitance. Since the detector for detecting the variation of the capacitance can correctly detect the displacement of the diaphragm even when the displacement is a small quantity, and since the detecting error is small, the pressure can be measured at high accuracy.

Further, according to another aspect of the present invention, it is preferred that the strain detector is provided on an elastically deformable detector main body spaced apart from the diaphragm by a predetermined distance and connected to the diaphragm with a coupling portion.

In the above arrangement, the strain detector is provided on the detector main body that is connected to the diaphragm. With the above arrangement, the strain detector can obtain the displacement amount of the diaphragm by detecting the deformation amount of the detector main body when the detector main body is elastically deformed due to the displacement of the diaphragm. Thus, the pressure can be easily measured with a simple configuration.

Further, according to another aspect of the present invention, the detector can abut on the diaphragm.

In the above arrangement, the strain gage is directly attached to the diaphragm. With the above arrangement, the configuration of the pressure sensor module can be further simplified. Thus, the manufacturing cost can be reduced. Further, since the strain gage is directly attached to the diaphragm, the displacement of the diaphragm can be directly detected. Thus, the measurement accuracy for pressure of the fluid to be measured can be improved.

Further, according to another aspect of the present invention, it is preferred that a thin film is stuck to a surface of the diaphragm on a side of the thin film layer.

In the above arrangement, the thin film is stuck to the opening side of the diaphragm. With the above arrangement, even when the corrosive gas component originated from the fluid to be measured is permeated, the diaphragm can be prevented from being corroded owing to the protection of the thin film, and therefore the corrosive gas component can be effectively discharged or diluted through the vent hole. Thus, since the diaphragm can be securely prevented from being corroded, the service life of the pressure sensor module can be securely prolonged.

A pressure detecting device according to another aspect of the present invention includes a case having an opening for guiding into a fluid to be measured and the aforesaid pressure sensor module, the thin film layer sealing the opening, in which the vent hole allows the holding space to communicate with the outer space.

With such an arrangement, since the diaphragm will not be corroded by the corrosive gas or chemical solution, the measurement accuracy can be maintained even for long time use, and the lifetime of the pressure detecting device can be prolonged.

Further, according to another aspect of the present invention, it is preferred that the case is provided with, in a part thereof, the holder to fix the outer periphery of the thin film layer, so that the holding space is formed between the diaphragm and the thin film layer.

In the above arrangement, the case is provided with the holder, and the thin film layer is fixed to the case, so that the holding space is formed. With the above arrangement, since a part of the case can serve as the holder, it is not necessary to particularly employ a separate holder, thereby improving the productivity.

Further, according to another aspect of the present invention, it is preferred that the case includes an upper case provided on a side of the thin film layer on the side of the diaphragm and a lower case provided on a side of the thin film layer opposite to the diaphragm; and the thin film layer is sandwiched and fixed between the upper case and the lower case.

With the above arrangement, the thin film layer can be easily fixed by sandwiching and fixing the thin film layer between the upper case and the lower case. Herein, when the thin film layer is formed of an elastomeric synthetic resin such as Teflon (the registered trademark of E. I. Du Pont de Numours and Company), sealability can be substantially increased by sandwiching and fixing the thin film layer between the upper case and the lower case.

Further, according to another aspect of the present invention, it is preferred that at least one of the upper case and the lower case includes a fixing groove on at least a part of the position where the thin film layer is fixed; and the thin film layer includes a fixing projection to be fitted into the fixing groove on the outer periphery thereof, the thin film layer being sandwiched and fixed between the upper case and the lower case when the fixing projection is fitted into the fixing groove.

With the above arrangement, the thin film layer can be fixed more firmly by fitting the fixing projection of the thin film layer into the fixing groove provided on the upper case or the lower case, thereby increasing the sealability between the thin film layer and the case.

EXPLANATION OF CODES

1 . . . pressure transmitter (pressure detecting device); 2 . . . pressure sensor module; 10 . . . case; 10A . . . opening; 13 . . . base; 21 . . . detection board (detector); 22 . . . diaphragm; 23 . . . bonding glass (insulating member); 24 . . . thin film; 31 . . . thin film layer; 32 . . . circular member (holder); 33 . . . lot (displacement transmitter); 34 . . . holding space; 71 . . . cup-shaped pressure receiving thin film (thin film layer); 72 . . . lot (displacement transmitter); 73 . . . projection; 110A . . . upper case; 110B . . . lower case; 110D . . . fixing groove; 321 . . . vent hole; 711 . . . bottom portion; 712 . . . cylindrical portion; 713A . . . fixing projection

BEST MODE FOR CARRYING OUT THE INVENTION

First Embodiment

A pressure transmitter of a first embodiment of the present invention will be described below with reference to the attached drawings.

(Arrangement of Pressure Transmitter of First Embodiment)

Figure 1:
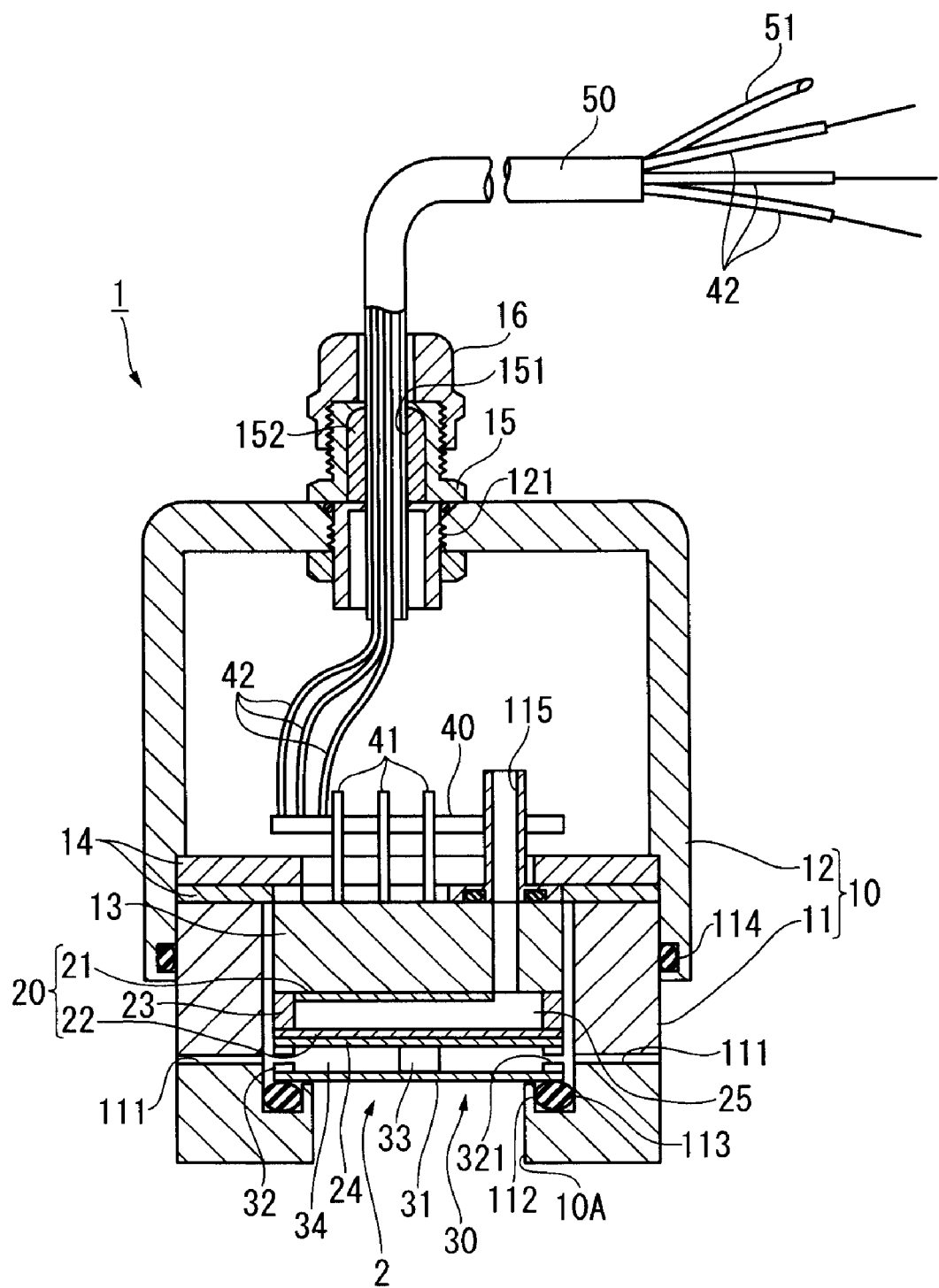
FIG. 1 is a cross section showing a pressure transmitter of a first embodiment of the present invention.

As shown in FIG. 1, a pressure transmitter 1 is a pressure detecting device arranged at a predetermined position in a pipeline and adapted to measure the pressure of a fluid to be measured flowing in the pipeline. Note that although the present invention is explained here using the pressure transmitter 1 as an example, the present invention is not limited thereto. For example, the present invention also can be applied to a pressure switch that detects the pressure in a chamber and generates different signals corresponding to the detected pressure value. Further, in the present embodiment, although examples of the fluid to be measured possible to be measured by the pressure transmitter 1 are fluids such as highly corrosive gases or chemical solutions, the fluid to be measured also can be various other fluids such as other gases, liquids and gelled materials. The pressure transmitter 1 includes a substantially cylindrical case 10 having an opening 10A at one end thereof, a pressure sensor element 20 of, for example, electrostatic capacitance type housed in the case 10, a pressure receiver 30 for receiving the pressure of the fluid to be measured, a conversion circuit 40 for converting a variation of electrical capacitance of the pressure sensor element 20 into a predetermined electric signal, and a joint (not shown) for guiding the fluid to be measured to the pressure receiver 30. The pressure sensor element 20, the pressure receiver 30 and the like constitute a pressure sensor module 2, the pressure sensor element 20 facing one surface of a base 13 (which will be described later) provided inside the case 10.

The case 10 includes a first case 11 having the opening 10A, and a second case 12 fixed to the first case 11.

The first case 11 is substantially cylinder-shaped and surrounds the peripheries of the pressure sensor element 20 and of the pressure receiver 30. The substantially circular opening 10A of the first case 11 engages with a joint (not shown). The first case 11 includes communication holes 111 (which will be described later) and a recess 112 formed along an outer peripheral edge of the opening 10A side of the pressure receiver 30. The recess 112 is substantially ring-shaped, and a seal member 113 is provided between the recess 112 and the pressure receiver 30, so that the recess 112 and the pressure receiver 30 are completely sealed from each other. The seal member 113 may be, for example, an O-ring made of fluoro-rubber, Kalrez (Trademark of DuPont) or the like. Thereby the fluid to be measured is prevented from entering from the opening 10A into the inside of the pressure receiver 30 and the communication holes 111.

The opening 10A engages with a joint (not shown). The joint includes a pressure guiding section (not shown) inserted into the opening 10A of the first case 11 to guide the fluid to be measured into the pressure receiver 30 provided inside the first case 11.

Further, a substantially columnar base 13 is arranged concentrically to substantially the central axis of the first case 11. The pressure sensor element 20 is attached on the opening 10A side of the base 13. An inserting hole for inserting wirings 41 that electrically connect the pressure sensor element 20 and the conversion circuit 40 is formed in the base 13. Also formed in the base 13 is a pressure adjusting hole 115 which allows a displacement space 25, which is formed between the base 13 and a diaphragm 22 (which will be described later) of the pressure sensor element 20, and the inner space of the second case 12 to communicate with each other.

The second case 12 covers one end of the first case 11 on the side opposite to the opening 10A. The inner peripheral side of the second case 12 is provided with, for example, an attachment piece 14 projecting inward, and the first case 11 and the second case 12 are fixed to each other by screwing the first case 11 to the attachment piece 14. A seal member 114 is provided between the first case 11 and the second case 12 so that the first case 11 and the second case 12 are completely sealed from each other.

The second case 12 is provided with an inserting hole 121 for inserting therein a cable 50 that assembles an electric signal wirings 42 and a tube 51 into one bundle, the electric signal wirings 42 being connected to the conversion circuit 40, the tube 51 allowing the inner space of the second case 12 to communicate with the outside of the case 10. The inserting hole 121 has internal threads formed on the inner peripheral surface thereof, and the first cap 15 is screwed to the internal threads. The first cap 15 is screwed to the inserting hole 121 in a condition where a seal member is wound on external threads of the first cap 15 so that the case 10 can be tightly sealed from outside. An inserting portion 151 for inserting the cable 50 is formed at the axis of the first cap 15. A seal member 152 is provided between the inserting portion 151 and the cable 50 to keep sealability of the inserting portion 151. The first cap 15 has exterior threads formed on a tip end thereof, and a second cap 16 is screwed to the exterior threads. The cable 50 is fixed by the second cap 16.

Figure 2:
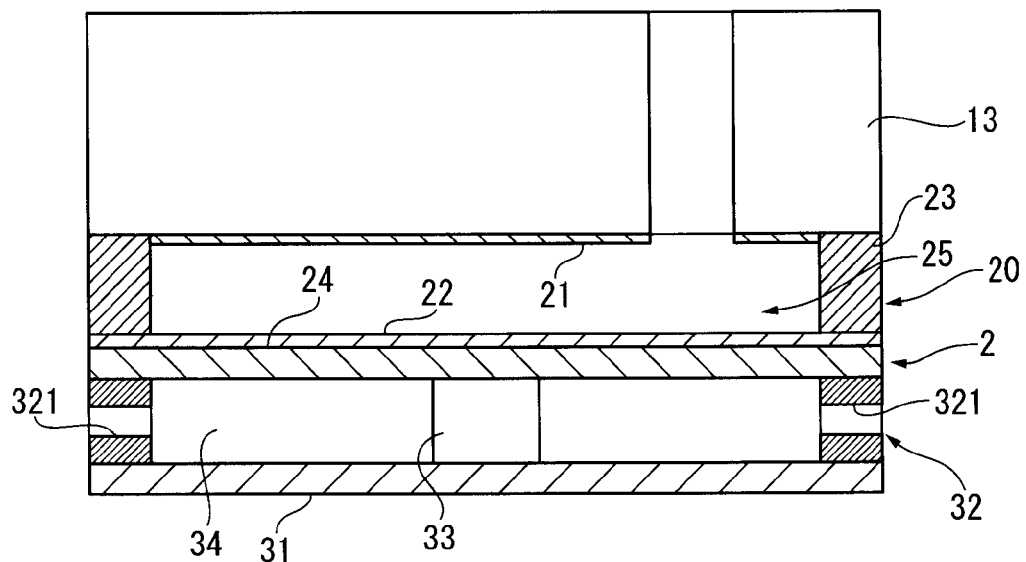
FIG. 2 is a cross section showing a pressure sensor module and a pressure receiver of the first embodiment.

As shown in FIG. 2, the pressure sensor element 20 includes a detection board 21 formed on a surface of the base 13 on the opening 10A side, and the diaphragm 22 facing the detection board 21. The diaphragm 22 is attached via a bonding glass 23 (an insulating member having a substantially circular shape) formed along an outer peripheral edge of the base 13 on the opening 10A side. The bonding glass 23 is tightly bonded to the base 13 and the diaphragm 22 with, for example, an adhesive, so that the displacement space 25 is tightly sealed. The displacement space 25 can communicate with the outside through the pressure adjusting hole 115 via the second case 12 and the tube 51. Thus, the pressure in the displacement space 25 can be kept to equal to the pressure of the outside (the atmospheric pressure, for example).

The diaphragm 22 is substantially disc-shaped. As mentioned above, the diaphragm 22 has the outer peripheral end thereof bonded to the bonding glass 23 and has the outer peripheral edge thereof brought into contact with the inner peripheral surface of the first case 11. The inner part of the diaphragm 22 surrounded by the bonding glass 23 can be displaced in the axial direction corresponding to the variation of the pressure of the fluid to be measured. Although a ceramic diaphragm excellent in wear resistance, chemical resistance, heat resistance, and insulation is adopted as the diaphragm 22 in the present embodiment, the present invention is not limited thereto. For example, a metallic diaphragm made of a stainless steel, a silicone diaphragm or the like also can be adopted as the diaphragm 22. In the case where the metallic diaphragm is adopted, an insulating thin film is preferably stuck to a surface of the metal, so that an electrode (that will be described later) provided on the diaphragm is electrically insulated from the diaphragm. A thin film 24 is stuck to a surface of the diaphragm 22 on the pressure receiver 30 side. The thin film 24 may be made of various fluororesins such as PTFE (PolyTetraFluoroEthylene), PFA (PerFluoroAlkoxylalkane), FEP copolymer (TetrafluoroEthyrene/hexafluoroPropylene copolymer), ETFE copolymer (Ethylene/TetraFluoroEthylene copolymer), PVDF resin (PolyVinyliDeneFluoride resin), PCTFE (PolyChloroTriFluoroEthylene) or the like. Each of these fluororesins is excellent in chemical resistance, and will not be corroded by corrosive gases or chemical solutions. Note that the material for the thin film 24 is not limited these fluororesins, but can be other material excellent in corrosion resistance, such as a high-density polyethylene. However, even when a fluororesin or other material excellent in corrosion resistance is adopted, there is still a possibility that the material might be corroded by specific organic solvents, so that it is preferred that the material be selected in accordance with the type and property of the fluid to be measured.

A pair of electrodes, which serve as a detector, are formed on the facing surfaces of the detection board 21 and the diaphragm 22 with the displacement space 25 interposed therebetween. When the pressure of the fluid to be measured varies, the diaphragm 22 will be displaced in accordance with the pressure of the fluid to be measured, so that the electrical capacitance of the pressure sensor element 20 will vary. The wirings 41 are connected to the detection board 21 and the diaphragm 22, the wirings 41 passing through the inserting hole of the base 13 and each having one end connected to the conversion circuit 40. The conversion circuit 40 detects the variation of electrical capacitance of the electrodes of the detection board 21 and the diaphragm 22, converts the detected variation of electrical capacitance into a voltage output signal, and outputs the signal to a measuring device connected to the electric signal wiring 42.

The pressure receiver 30 is provided on the opening 10A side of the diaphragm 22. The pressure receiver 30 includes a substantially disc-shaped thin film layer 31 contacting the fluid to be measured on the opening 10A side, a circular member (serving as a holder for holding the thin film layer 31) bonded to the outer periphery of the diaphragm 22, and a lot 33 (serving as a displacement transmitter) provided between the thin film layer 31 and the diaphragm. The thin film layer 31, the circular member 32 and the lot 33 are bonded to each other by melting press-fitting. Incidentally, the thin film layer 31, the circular member 32 and the lot 33 also can be integrally molded of fluororesin. In such a case, since bonding work is eliminated, the productivity can be improved. Further, since the thin film layer 31, the circular member 32 and the lot 33 will not be separated away from each other, the service life of the pressure sensor module 2 can be prolonged.

Similar to the thin film 24, the thin film layer 31 is made of various fluororesins such as PTFE, PFA, ETFE, FEP, PVDF, PCTFE or the like, or made of other synthetic resins excellent in corrosion resistance. The diaphragm 22 side of the outer periphery of the thin film layer 31 and the circular member 32 are tightly fixed with each other by means of bonding, molting or the like, so that the thin film layer 31 and the circular member 32 are integrally formed. As mentioned above, the circular seal member 113 is provided between the opening 10A side of the outer periphery of the thin film layer 31 and the first case 11, so that the thin film layer 31 and the first case 11 are sealed from each other.

The circular member 32 has a shape of, for example, a cylinder having a predetermined height, so that a holding space 34 is formed between the diaphragm 22 and the thin film layer 31. The circular member 32 may be made of material excellent in corrosion resistance, such as a fluororesin, or made of a synthetic resin having high hardness, or made of a metal coated with a fluororesin or the like. A plurality of vent holes 321 penetrating from the inner peripheral surface to the outer peripheral surface of the circular member 32 are formed in the circular member 32 at a predetermined interval. As shown in FIGS. 1 and 2, the vent holes 321 are formed in symmetric positions with respect to substantially the center of the circular member 32. The vent holes 321 are connected to the communication holes 111 of the first case 11. As mentioned above, since the communication holes 111 communicate with the outside of the first case 11, the holding space 34 can be ventilated to the outside of the case 10 through the vent holes 321 and the communication holes 111. Thus, even when a corrosive gas component originated from the fluid to be measured permeates through the thin film layer 31 into the holding space 34, the corrosive gas component can be replaced with the atmosphere outside the first case 11 through the vent holes 321 and the communication holes 111. Incidentally, the communication hole 111 may alternatively be provided with a pump for example. With such an arrangement, since the holding space 34 is effectively ventilated, even when the corrosive gas component originated from the fluid to be measured permeates into the holding space 34, the permeated corrosive gas component can be effectively discharged or diluted.

The lot 33 has a shape of a column having a height substantially equal to the height of the circular member 32. The lot 33 is arranged concentrically to substantially the central axis of the holding space 34. That is, the lot 33 connects substantially the center of the diaphragm 22 and substantially the center of the thin film layer 31, so that the diaphragm 22 and the thin film layer 31 are connected via the lot 33. The other end of the lot 33 is bonded to the diaphragm 22. When the thin film layer 31 is displaced upon receiving the pressure of the fluid to be measured, the lot 33 transmits the displacement of the thin film layer 31 to the diaphragm 22. Accordingly, the lot 33 is preferably made of a material that has relatively high hardness and that does not bend when the thin film layer 31 is displaced. Further, in order for the thin film layer 31 not to be bent by the weight of the lot 33, the lot 33 is preferably made of a material having lower density. Incidentally, to reduce the weight of the lot 33, the lot 33 may alternatively be formed in a hollow shape.

(Advantages of Pressure Transmitter of First Embodiment)

In the pressure sensor module 2 of the pressure transmitter 1 of the first embodiment, the holding space 34 is formed between the diaphragm 22 and the thin film layer 31, and the holding space 34 is provided with the vent holes 321 and the communication holes 111 communicating with the outside of the first case 11. Thus, when a corrosive gas or chemical solution is used as a fluid to be measured, even if the corrosive gas component originated from the corrosive gas or chemical solution permeates through the thin film layer 31 into the holding space 34, the permeated fluid to be measured can be discharged to the outside of the case 10 through the vent holes 321 and the communication holes 111 provided for the holding space 34, so that the permeated fluid to be measured can be removed or diluted. Accordingly, even when the pressure sensor module 2 is used for long time, the corrosive gas component permeated through the thin film layer 31 can be instantly discharged or diluted, therefore the diaphragm 22 can be prevented from being corroded by the fluid to be measured. Thus, not only the measurement accuracy of the pressure sensor module 2 can be maintained for long time, but also the durability of the pressure sensor module 2 can be maintained for long time, so that the service life of the pressure sensor module 2 can be prolonged.

The circular member 32 is formed between the outer periphery of the diaphragm 22 and the outer periphery of the thin film layer 31, so that the holding space 34 is formed. Thus, the holding space 34 having the same height of that of the circular member 32 can be securely formed. Further, since the circular member 32 is bonded to the outer periphery of the diaphragm 22 and the outer periphery of the thin film layer 31, the pressure of the fluid to be measured can be received by entire inner portion inside the circular member 32, the pressure detecting accuracy of the pressure sensor module 2 can be improved.

The holding space 34 is provided with the plurality of vent holes 321. Thus, the holding space 34 can be ventilated to the outside of the case 10 through the vent holes 321 and the communication holes 111. Thus, even when the corrosive gas component originated from the fluid to be measured permeates through the thin film layer 31 into the holding space 34, the permeated corrosive gas component can be discharged through the plurality of the vent holes 321. Further, there also can be an alternative arrangement in which, among the plurality of vent holes 321, some vent holes 321 serve as outlet vent holes 321 for discharging the corrosive gas component originated from the fluid to be measured permeated into the holding space 34, and the remaining vent holes 321 serve as inlet vent holes 321 for actively replacing the atmosphere inside the holding space 34 which is corrosive gas atmosphere due to the permeated corrosive gas component originated from the fluid to be measured. With this arrangement, the holding space 34 can be ventilated more effectively. Thus, the diaphragm 22 can be securely prevented from being corroded by the corrosive gas or chemical solution.

The lot 33 is arranged concentrically to substantially the central axis of the holding space 34 which is an axis formed by connecting substantially the center of the diaphragm 22 and substantially the center of the thin film layer 31. Thus, since the lot 33 is arranged at a position corresponding to a position of the thin film layer 31 at which the maximum displacement caused by the pressure of the fluid to be measured is generated, the displacement amount of the thin film layer 31 can be securely transmitted to the diaphragm 22 through the lot 33.

Further, as mentioned above, the thin film layer 31, the circular member 32 and the lot 33 of the pressure receiver 30 can be integrally molded. With such an arrangement, even when the corrosive gas component originated from the fluid to be measured permeates into the holding space 34, the circular member 32 and the lot 33 will not be separated away from the thin film layer. Thus, the thin film layer 31, the circular member 32 and the lot 33 are prevented from deterioration caused by the separation even for long time use. Further, since the thin film layer 31, the circular member 32 and the lot 33 are integrally molded, the work for bonding the thin film layer 31, the circular member 32 and the lot 33 to each other can be eliminated, thereby improving the productivity.

The thin film layer 31 is made of a fluororesin. Since such a fluororesin is excellent in corrosion resistance, the thin film layer 31 will not be corroded even when the fluid to be measured is a highly corrosive gas or chemical solution, the corrosive gas component originated from the fluid to be measured can be effectively prevented from permeating into the holding space.

Further, in the pressure transmitter 1, the detection board 21 is fixed on the base 13 fixed inside the case 10, and the pair of electrodes are formed on the facing surfaces of the detection board 21 and the diaphragm 22 so as to form a capacitor. Thus, when the diaphragm 22 is displaced, the capacitance of the capacitor will vary, and the pressure of the fluid to be measured can be measured corresponding to the variation of the capacitance of the capacitor. Thus, the pressure can be measured at high accuracy even when the diaphragm 22 is displaced for very slight quantity.

The thin film 24 is stuck to the opening 10A side of the diaphragm 22. Thus, even when the corrosive gas component originated from the fluid to be measured permeates through the thin film layer 31 into the holding space 34, since the diaphragm 22 is protected by the thin film 24, the diaphragm 22 can be prevented from being corroded. Since the corrosive gas component can be discharged or diluted instantly through the vent holes, the thin film 24 will not be separated off due to the permeated corrosive gas component. Thus, the diaphragm can be securely prevented from being corroded, and the service life of the pressure sensor module can be securely prolonged.

The vent holes 321 are formed in symmetric positions with respect to substantially the center of the circular member 32. Thus, a smooth vent path is formed by allowing the air to flow from the vent holes 321 on one side to the vent holes 321 on the other side. Thus, the ventilating efficiency of the holding space 34 can be improved.

Second Embodiment

A pressure transmitter of a second embodiment of the present invention will be described below with reference to the attached drawings. Incidentally, in the following description, like components are denoted by like numerals as of the first embodiment and the explanation thereof will be omitted or briefed.

(Arrangement of Pressure Transmitter of Second Embodiment)

Figure 3:
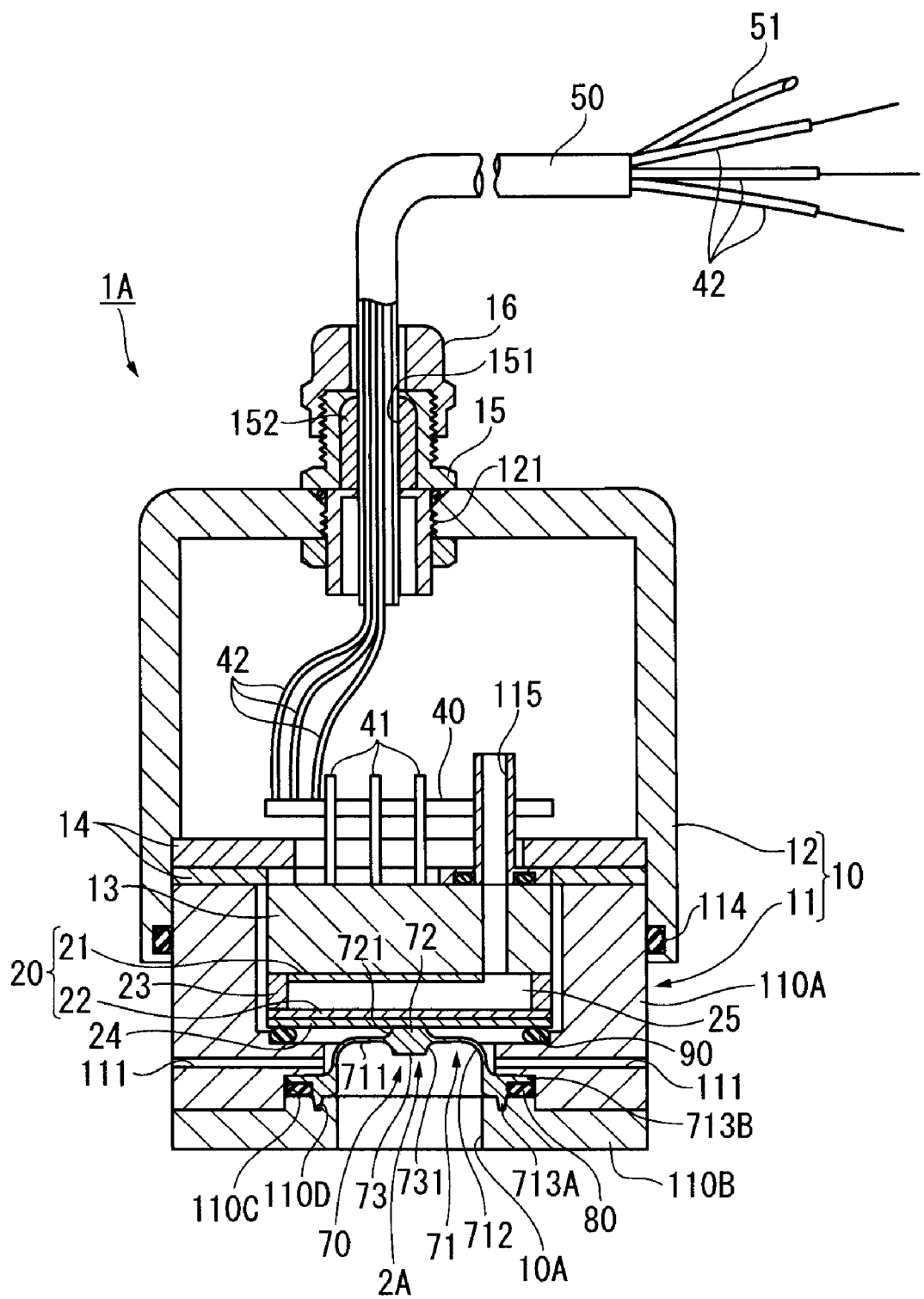
FIG. 3 is a cross section showing a pressure transmitter of a second embodiment of the present invention.

As shown in FIG. 3, a pressure transmitter 1A, similar to the pressure transmitter 1A of the first embodiment, is a pressure detecting device arranged at a predetermined position in a pipeline and adapted to measure the pressure of a fluid to be measured flowing in the pipeline. Further, similar to the first embodiment, although examples of the fluid to be measured possible to be measured by the pressure transmitter 1A are fluids such as highly corrosive gases or chemical solutions, the fluid to be measured also can be various other fluids such as other gases, liquids and gelled materials. The pressure transmitter 1A includes the substantially cylindrical case 10 having the opening 10A at one end thereof, a pressure sensor element 20 of, for example, electrostatic capacitance type housed in the case 10, a pressure receiver 70 for receiving the pressure of the fluid to be measured, the conversion circuit 40 for converting a variation of electrical capacitance of the pressure sensor element 20 into a predetermined electric signal, and a joint (not shown) for guiding the fluid to be measured to the pressure receiver 70. A pressure sensor module 2A is provided with the diaphragm 22, the pressure sensor element 20 and the pressure receiver 70, the diaphragm 22 facing one surface of the base 13 (which will be described later) provided inside the case 10.

The case 10, similar to the case 10 of the first embodiment, includes the first case 11 having the opening 10A, and the second case 12 fixed to the first case 11.

The first case 11 is substantially cylinder-shaped and surrounds the peripheries of the pressure sensor element 20 and of the pressure receiver 70. The substantially circular opening 10A of the first case 11 engages with a joint (not shown). The first case 11 is provided with the communication holes 111 that serve as vent holes, an upper case 110A that also serves as a holder, and a lower case 110B fitted into the upper case 110A. The upper case 110A is formed with a recessed portion 110C for sandwiching a thin film holder 713, the recessed portion 110C being formed on the inner peripheral side of the upper case 110A, in the boundary position to the lower case 110B. Further, the lower case 110B is formed, in a position facing the recessed portion 110C, with a substantially circular fixing groove 110D. The fixing groove 110D has a taper-shaped cross section of which width becomes gradually smaller as it gets farther from the upper case 110A.

The joint connected to the opening 10A includes a pressure guiding section (not shown) inserted into the opening 10A of the first case 11 to guide the fluid to be measured into the pressure receiver 70 provided inside the first case 11.

The substantially columnar base 13 is arranged concentrically to substantially the central axis of the upper case 110A of the first case 11. The pressure sensor element 20 is attached on the opening 10A side of the base 13. A sensor holder 90 (an O-ring, for example) is provided between a part of the inner peripheral surface of the upper case 110A of the first case 11 and the pressure sensor element 20. An inserting hole for inserting the wirings 41 that electrically connect the pressure sensor element 20 and the conversion circuit 40 is formed in the base 13. Also formed in the base 13 is the pressure adjusting hole 115 which allows the displacement space 25, which is formed between the base 13 and the diaphragm 22 of the pressure sensor element 20, and an inner space of the second case 12 to communicate with each other.

The second case 12 covers one end of the first case 11 on the side opposite to the opening 10A. The inner peripheral side of the second case 12 is provided with, for example, the attachment piece 14 projecting inward, and the first case 11 and the second case 12 are fixed to each other by screwing the first case 11 to the attachment piece 14. The seal member 114 is provided between the first case 11 and the second case 12 so that the first case 11 and the second case 12 can be completely sealed from each other.

The second case 12 is provided with the inserting hole 121 for inserting therein the cable 50 that assembles the electric signal wirings 42 and the tube 51 into one bundle, the electric signal wirings 42 being connected to the conversion circuit 40, the tube 51 allowing the inner space of the second case 12 to communicate with the outside of the case 10. The first cap 15 is screwed to internal threads formed on the inner peripheral surface of the inserting hole 121. The first cap 15 is screwed to the inserting hole 121 in a condition where a seal member is wound on the external threads of the first cap 15 so that the inside of the case 10 can be tightly sealed from outside. The inserting portion 151 for inserting the cable 50 is formed at the axis of the first cap 15. The seal member 152 is provided between the inserting portion 151 and the cable 50 to keep sealability of the inserting portion 151. The first cap 15 has exterior threads formed on a tip end thereof, and the second cap 16 is screwed to the exterior threads. The cable 50 is fixed by the second cap 16.

Similar to the first embodiment, the pressure sensor element 20 includes the detection board 21 formed on a surface of the base 13 on the opening 10A side, and the diaphragm 22 facing the detection board 21. The diaphragm 22 is attached through the bonding glass 23. The bonding glass 23 is tightly bonded to the base 13 and the diaphragm 22 with, for example, an adhesive, so that the tightly sealed displacement space 25 is formed. As mentioned above, the displacement space 25 can communicate with the outside through the pressure adjusting hole 115 via the second case 12 and the tube 51. Thus, the pressure of the displacement space 25 is kept to equal to the pressure of the outside (the atmospheric pressure, for example).

Similar to the first embodiment, the diaphragm 22 is substantially disc-shaped. As mentioned above, the diaphragm 22 has the outer peripheral end thereof bonded to the bonding glass 23 and has the outer peripheral edge thereof brought into contact with the inner peripheral surface of the first case 11. The inner part of the diaphragm 22 surrounded by the bonding glass 23 can be displaced in the axial direction corresponding to the variation of the pressure of the fluid to be measured. Although, similar to the first embodiment, a ceramic diaphragm excellent in wear resistance, chemical resistance, heat resistance, and insulation is adopted as the diaphragm 22, the present invention is not limited thereto. For example, a metallic diaphragm made of a stainless steel, a silicone diaphragm or the like also can be adopted as the diaphragm 22. In the case where the metallic diaphragm is adopted, an insulating thin film is preferably stuck to a surface of the metal, so that an electrode (that will be described later) provided on the diaphragm is electrically insulated from the diaphragm. The thin film 24 is stuck to a surface of the diaphragm 22 on the pressure receiver 70 side. Similar to the first embodiment, the thin film 24 may be made of various fluororesins such as PTFE (PolyTetraFluoroEthylene), PFA (PerFluoroAlkoxylalkane), FEP copolymer (TetrafluoroEthyrene/hexafluoroPropylene copolymer), ETFE copolymer (Ethylene/TetraFluoroEthylene copolymer), PVDF resin (PolyVinyliDeneFluoride resin), PCTFE (PolyChloroTriFluoroEthylene) or the like. Each of these fluororesins is excellent in chemical resistance, and will not corroded by corrosive gases or chemical solutions. Note that the material for the thin film 24 is not limited these fluororesins, but can be other material excellent in corrosion resistance, such as a high-density polyethylene. However, even when a fluororesin or another material excellent in corrosion resistance is adopted, there is still a possibility that the material might be corroded by specific organic solvents, so that it is preferred that the material be selected in accordance with the type and property of the fluid to be measured.

Similar to the first embodiment, a pair of electrodes, which serve as a detector, are formed on the facing surfaces of the detection board 21 and the diaphragm 22 with the displacement space 25 interposed therebetween. When the pressure of the fluid to be measured varies, the diaphragm 22 will be displaced in accordance with the pressure of the fluid to be measured, so that the electrical capacitance of the pressure sensor element 20 will vary. The wirings 41 are connected to the detection board 21 and the diaphragm 22, the wirings 41 passing through the inserting hole of the base 13 and each having one end connected to the conversion circuit 40. The conversion circuit 40 detects the variation of electrical capacitance of the electrodes of the detection board 21 and the diaphragm 22, converts the detected variation of the electrical capacitance into a voltage output signal, and outputs the signal to a measuring device connected to the electric signal wiring 42.

The pressure receiver 70 is provided on the opening 10A side of the diaphragm 22. The pressure receiver 70 includes a cup-shaped pressure receiving thin film 71 (a thin film layer), a lot 72 (a displacement transmitter) integrally formed with the cup-shaped pressure receiving thin film 71, and a projection 73 integrally formed with the cup-shaped pressure receiving thin film 71.

Figure 4:
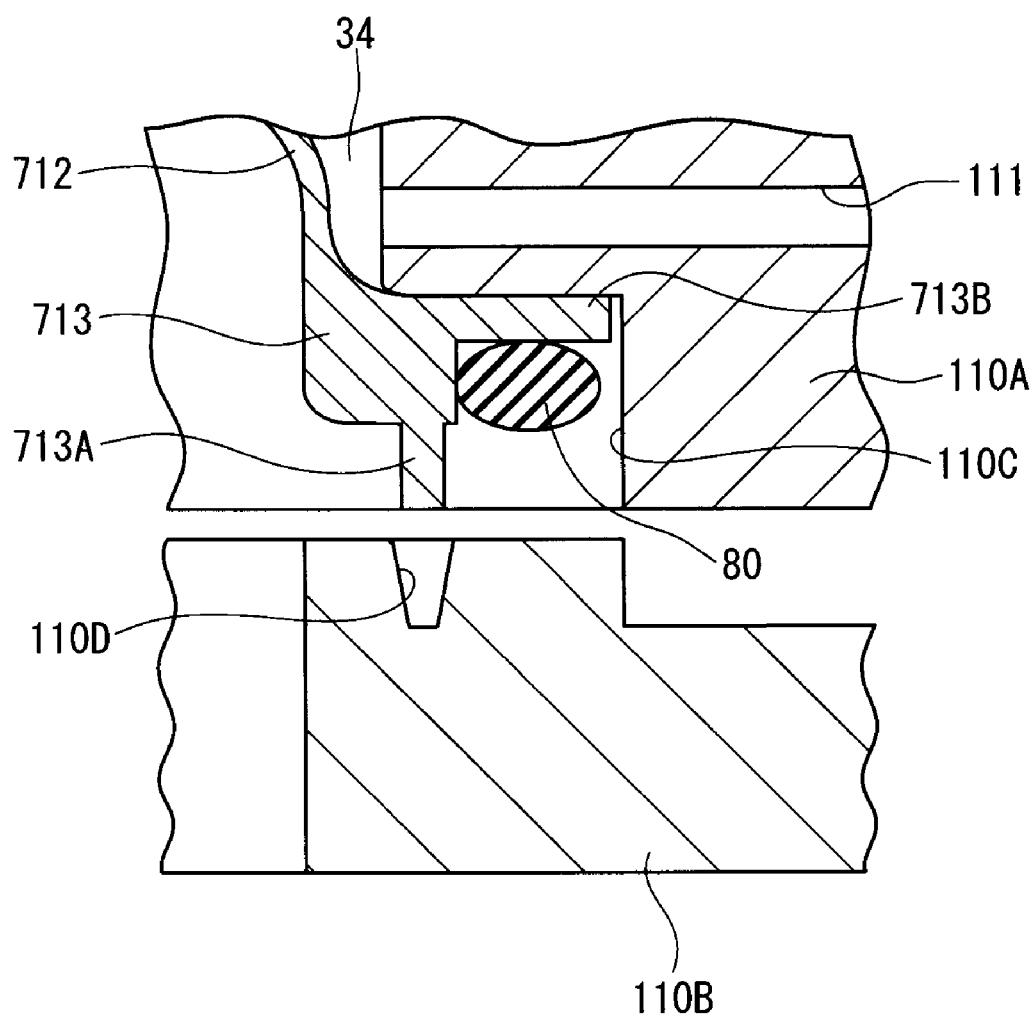
FIG. 4 is an enlarged cross section showing a part of a cup-shaped pressure receiving thin film of the second embodiment.

The cup-shaped pressure receiving thin film 71 includes a bottom portion 711, a cylindrical portion 712 and a thin film holder 713. The bottom portion 711 is substantially disc-shaped and is disposed in a position to face the thin film 24. The cylindrical portion 712 curves and extends from disc outer periphery of the bottom portion 711 toward the side of the opening 10A. The bottom portion 711 and the cylindrical portion 712 form the cup-shaped pressure receiving thin film 71, which substantially has the shape of a cup protruded toward the diaphragm 22 side. The thin film holder 713 extends from the outer peripheral edge of the cylindrical portion 712. The thin film holder 713 is thicker than the cylindrical portion 712. The thin film holder 713 includes a fixing projection 713A that protrudes toward the opening 10A side, and a fixing flange 713B that extends away from the axis of the cup-shaped pressure receiving thin film 71 along the radial direction. As shown in FIG. 4, the thin film holder 713 of the cup-shaped pressure receiving thin film 71 is sandwiched by between the upper case 110A and the lower case 110B of the first case 11. Specifically, the cup-shaped pressure receiving thin film 71 is fixed by bringing the fixing flange 713B of the thin film holder 713 in close contact with the recessed portion 110C of the upper case 110A and fitting the fixing projection 713A of the thin film holder 713 into the fixing groove 110D of the lower case 110B with a seal member 80 (an O-ring, for example) interposed between the fixing flange 713B and the lower case 110B. The holding space 34 is formed between the cup-shaped pressure receiving thin film 71 and the diaphragm 22. The holding space 34 communicates with the outside of the pressure transmitter 1A through the communication holes 111.

Figure 5:
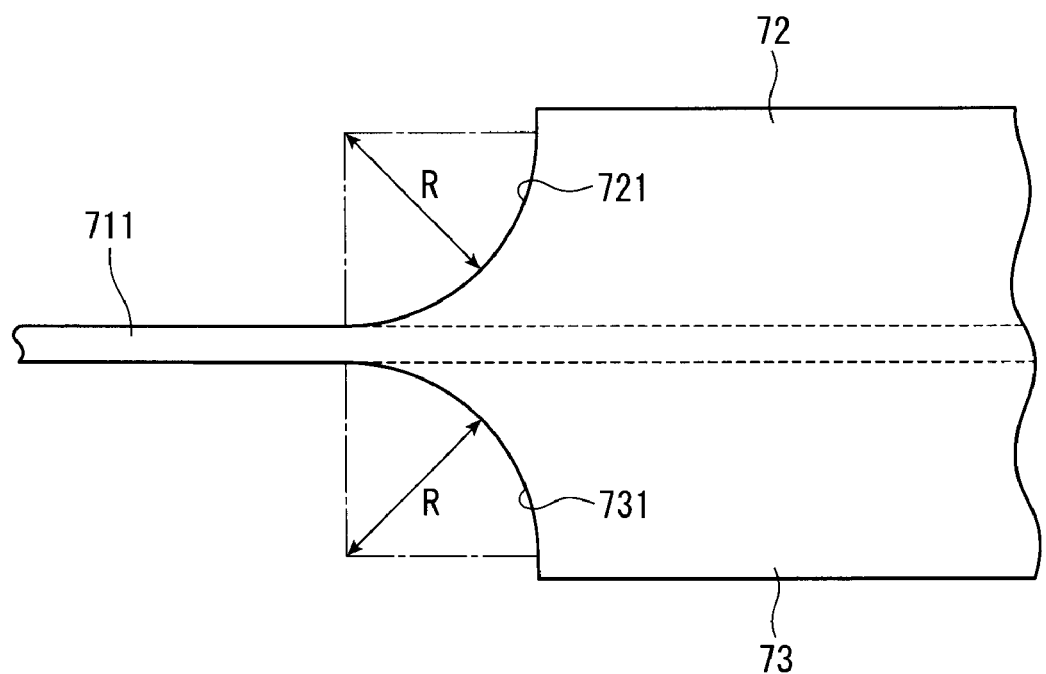
FIG. 5 is an enlarged cross section showing a part of a cup-shaped pressure receiving thin film of the second embodiment.

The lot 72 and the projection 73 are provided at substantially the central position of the bottom portion 711. The lot 72 is provided on the diaphragm 22 side of the bottom portion 711, and the projection 73 is provided on the opening 10A side of the bottom portion 711. The lot 72 and the projection 73 are symmetrically arranged with the bottom portion 711 interposed therebetween. Namely, the lot 72 and the projection 73 have the same radial distances from the axis and the same shape, and are arranged concentrically to the same axis. As shown in FIG. 5, the lot 72 is formed with a curved portion 721 which curves to draw a circular arc of a predetermined radius R, from the surface of the bottom portion 711 on the diaphragm 22 side to the tip end of the lot 72. Similar to the lot 72, the projection 73 is formed with a curved portion 731 which curves to draw a circular arc of the predetermined radius R, from the surface of the bottom portion 711 on the opening 10A side to the tip end of the projection 73. The tip end of the lot 72 is bonded substantially to the center of the diaphragm 22. When the cup-shaped pressure receiving thin film 71 receives the pressure of the fluid to be measured, the bottom portion 711 is displaced in its axis, and the lot 72 transmits the displacement of the bottom portion 711 to the diaphragm 22.

(Advantages of Pressure Transmitter of Second Embodiment)

In the pressure sensor module 2A of the pressure transmitter 1A of the second embodiment, the holding space 34 is formed between the diaphragm 22 and the cup-shaped pressure receiving thin film 71, and the holding space 34 is provided with the communication holes 111 communicating with the outside of the first case 11. With such an arrangement, similar to the pressure transmitter 1 of the first embodiment, when a corrosive gas or chemical solution is used as a fluid to be measured, even if the corrosive gas component originated from the corrosive gas or chemical solution permeates through the cup-shaped pressure receiving thin film 71 into the holding space 34, the permeated fluid to be measured can be discharged to the outside of the case 10 through the communication holes 111 communicating with the holding space 34, so that the permeated fluid to be measured can be removed or diluted. Accordingly, even when the pressure sensor module 2A is used for long time, the corrosive gas component permeated through the cup-shaped pressure receiving thin film 71 can be instantly discharged or diluted, therefore the diaphragm 22 can be prevented from being corroded by the fluid to be measured. Thus, not only the measurement accuracy of the pressure sensor module 2A can be maintained for long time, but also the durability of the pressure sensor module 2A can be maintained for long time, so that the service life of the pressure sensor module 2A can be prolonged.

Further, the bottom portion 711 and the cylindrical portion 712 form the cup-shaped pressure receiving thin film 71, which substantially has the shape of a cup protruded toward the diaphragm 22 side. The outer periphery of the cylindrical portion 712 is fixed to the first case 11. With such an arrangement, the stress caused by the pressure of the fluid to be measured received by the surface of the cup-shaped pressure receiving thin film 71 on the opening 10A side is dispersed to the whole cup-shaped pressure receiving thin film 71, instead of being concentrated on the lot 72. Thus, the pressure resistance of the cup-shaped pressure receiving thin film 71 can be improved. Further, since the cup-shaped pressure receiving thin film 71 has good pressure resistance, the cup-shaped pressure receiving thin film 71 can obtain sufficient pressure resistance even with reduced thickness. Accordingly, it is possible to improve the sensitivity of the pressure sensor module 2A by reducing the thickness of the cup-shaped pressure receiving thin film 71, thereby improving pressure detection accuracy.

Further, the lot 72 is formed with a curved portion 721 which curves to draw a circular arc of the predetermined radius R, from the surface to the tip end of the bottom portion 711. With such an arrangement, the stress caused by the pressure of the fluid to be measured received by the cup-shaped pressure receiving thin film 71 is dispersed to the whole curved portion 721, instead of being concentrated on the boundary between the lot 72 and the bottom portion 711. Thus, the pressure resistance of the cup-shaped pressure receiving thin film 71 can be further improved.

Further, the projection 73 having the curved portion 731 is formed on the opening 10A side of the bottom portion 711 of the cup-shaped pressure receiving thin film 71, the curved portion 731 curves to draw a circular arc of the predetermined radius R, from the surface of the bottom portion 711 to the tip end of the projection 73. With such an arrangement, similar to the curved portion 721 of the lot 72, the stress caused by the pressure of the fluid to be measured received by the cup-shaped pressure receiving thin film 71 is dispersed to the whole curved portion 731. Thus, the pressure resistance of the cup-shaped pressure receiving thin film 71 can be further improved. In combination with the curved portion 721 of the lot 72, the pressure resistance can be further improved, so that the service life of the cup-shaped pressure receiving thin film 71 can be prolonged due to the further improved the pressure resistance.

Further, the cup-shaped pressure receiving thin film 71, the lot 72 and the projection 73 are integrally formed. Thus, the number of components can be reduced, thereby improving productivity. Also, compared with the configuration in which the cup-shaped pressure receiving thin film 71, the lot 72 and the projection 73 are bonded to each other, the integrally molded lot 72 and the projection 73 do not separate away from the cup-shaped pressure receiving thin film 71. Thus, the pressure resistance of the cup-shaped pressure receiving thin film 71 is prevented from being deteriorated due to the separation of the lot 72 and the projection 73.

Further, the cup-shaped pressure receiving thin film 71 is fixed by fitting the fixing projection 713A into the taper-shaped fixing groove 110D. Thus, the sealability of the cup-shaped pressure receiving thin film 71 is improved. Further, since the O-ring 80 is sandwiched between the upper case 110A and the lower case 110B, the sealability can be further improved.

Further, since the cup-shaped pressure receiving thin film 71 is directly attached to the first case 11, the circular member 32 used in the first embodiment is eliminated, thereby simplifying the configuration. Further, by detaching the lower case 110B, the cup-shaped pressure receiving thin film 71 can be easily taken out, thereby improving maintainability.

OTHER EMBODIMENTS

It is to be understood that the present invention is not limited to the embodiments described above, and various modifications and improvements can be made as long as the objects of the present invention can be achieved.

Figure 6:
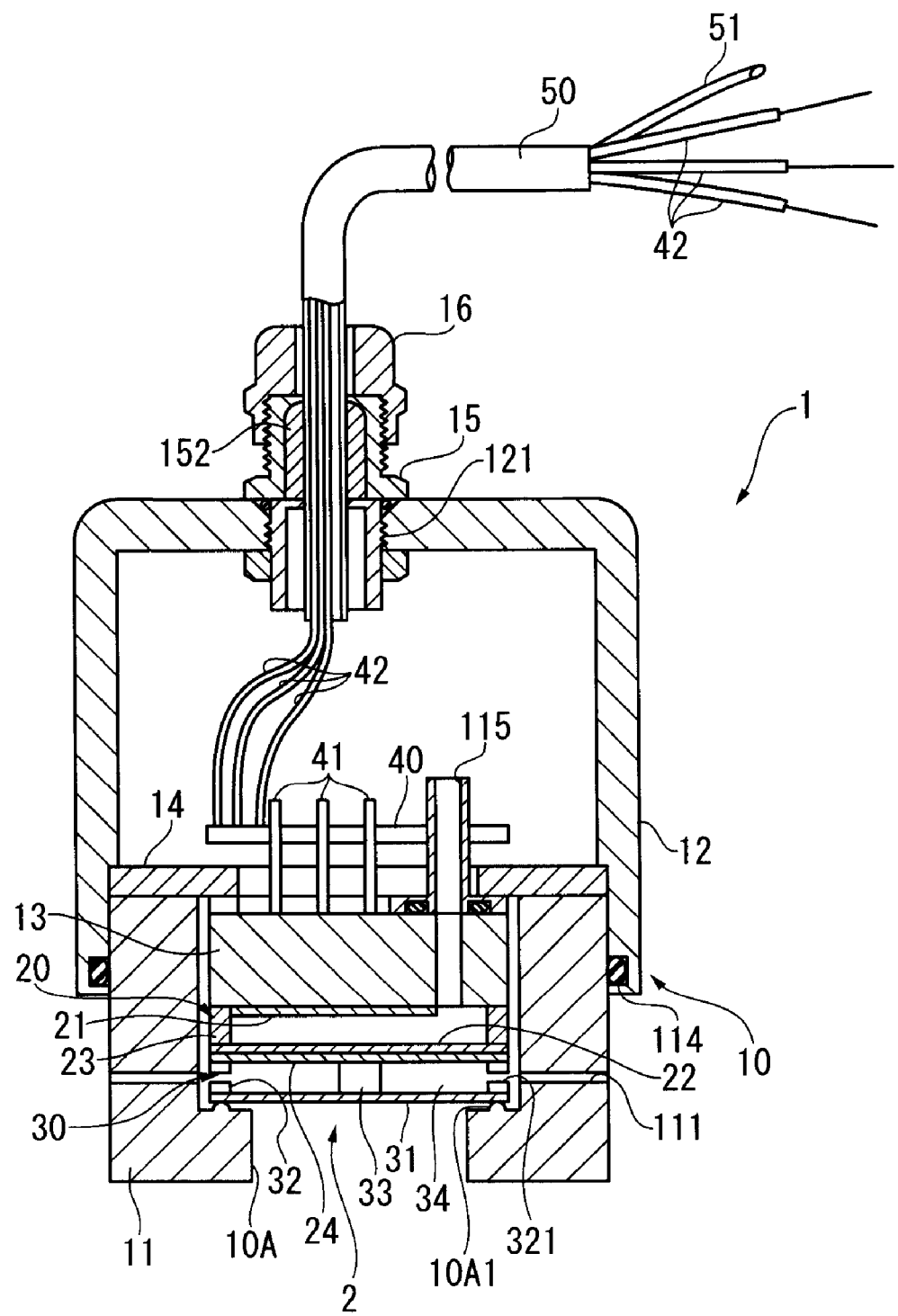
FIG. 6 is a cross section showing a pressure transmitter of another embodiment of the present invention.

For example, although in the first and second embodiments, the pressure receiver 30 and the first case 11 are sealed from each other by providing the ring-shaped seal member therebetween, the present invention is not limited thereto. For example, as shown in FIG. 6, the opening 10A of the first case 11 is provided with a ring-shaped projection 10A1 projected toward the side of the pressure receiver 30 in an annular form along the outer periphery of the thin film layer 31. The pressure receiver 30 and the pressure sensor element 20 are press-fitted between the ring-shaped projection 10A1 and the base 13. With such a configuration, the pressure receiver 30 and the first case 11 also can be sealed from each other. Further, since the seal member 113 is eliminated, the number of components can be reduced.

Figure 7:
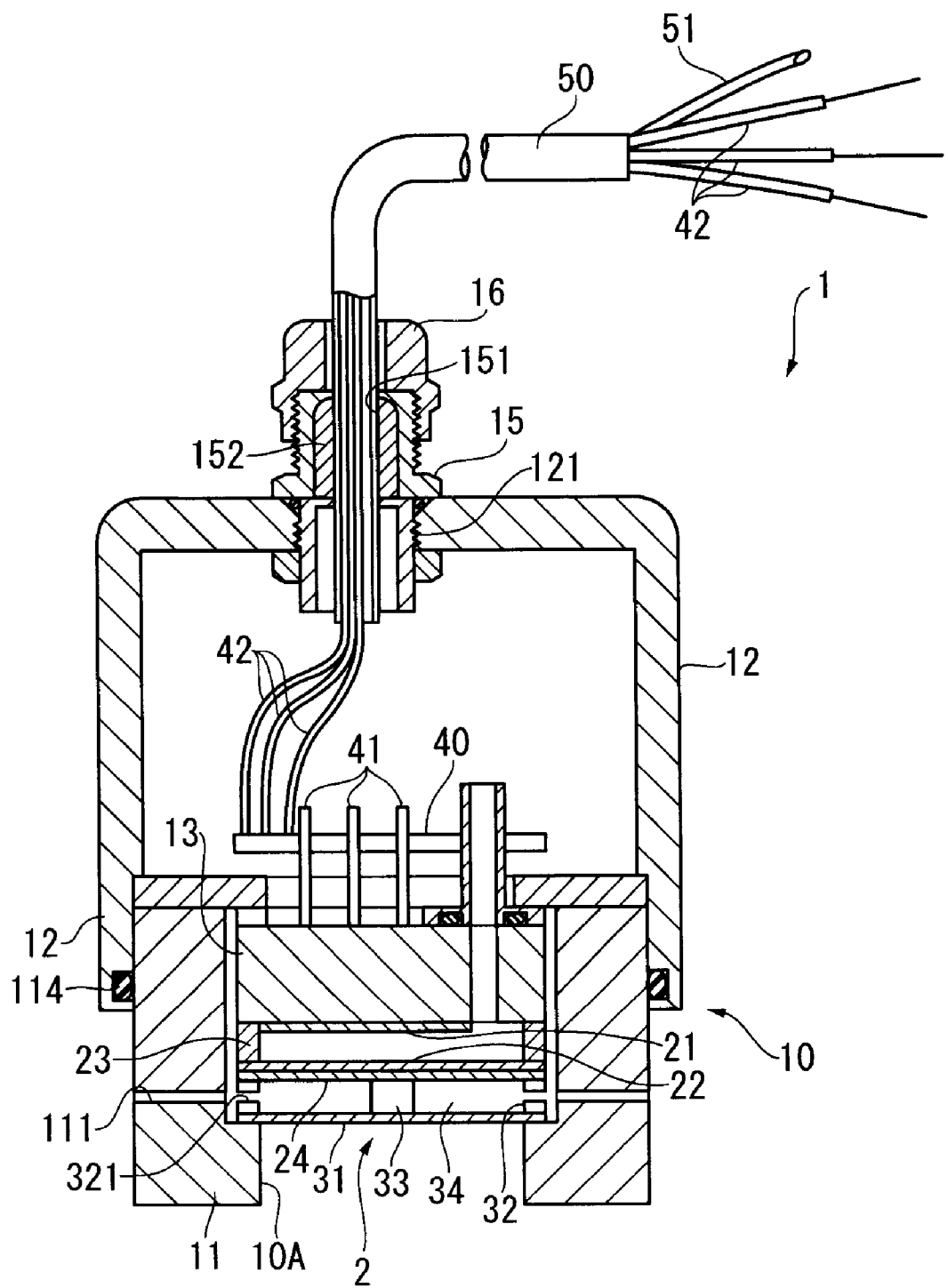
FIG. 7 is a cross section showing a pressure transmitter of yet another embodiment of the present invention.
Figure 8:
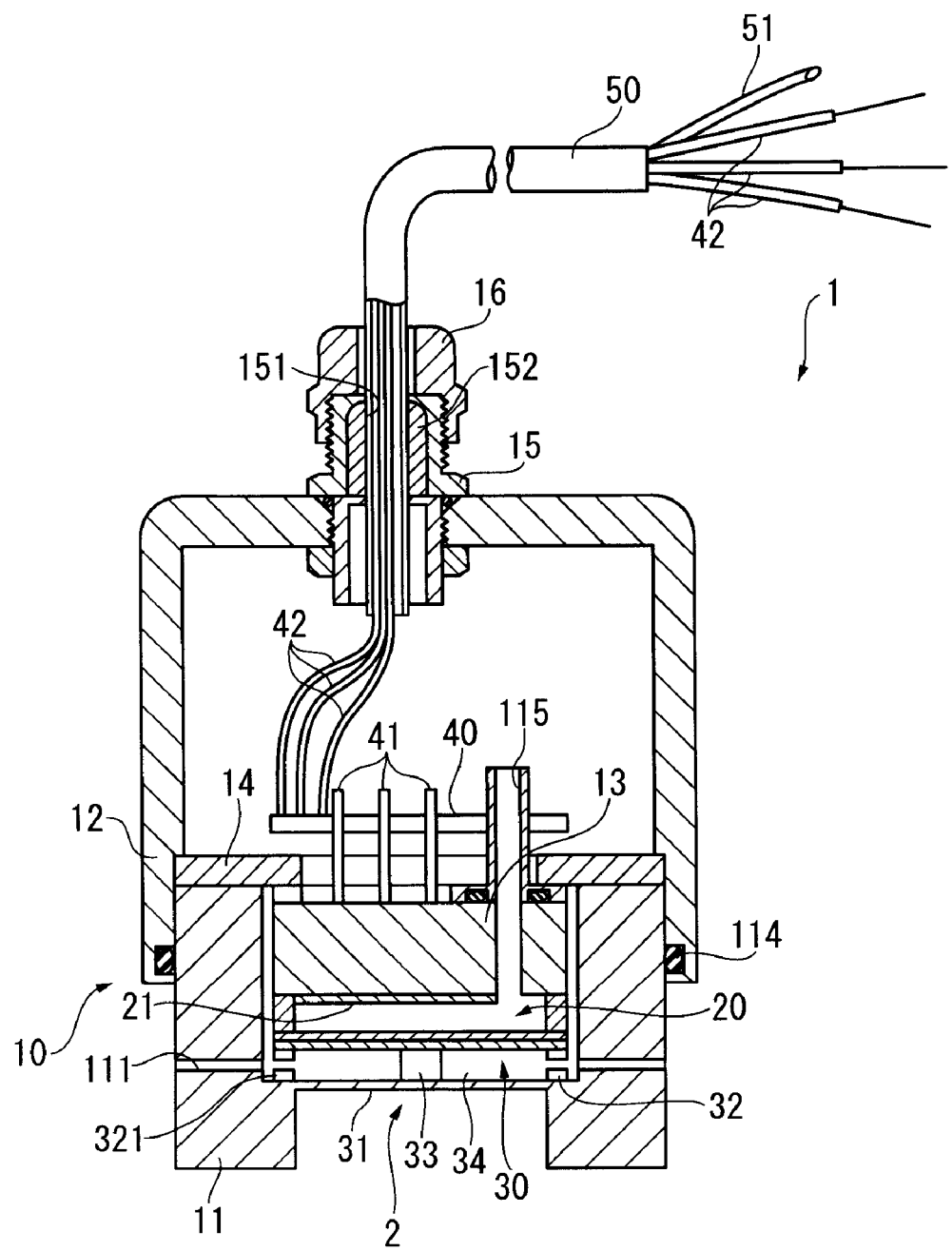
FIG. 8 is a cross section showing a pressure transmitter of yet another embodiment of the present invention.

Further, as shown in FIG. 7, there is another alternative configuration in which the thin film layer 31 of the first embodiment is directly stuck to the first case 11. Further, as shown in FIG. 8, there is another alternative configuration in which the thin film layer 31 and the first case 11 are integrally molded. With such a configuration, the thin film layer 31 and the first case 11 can be prevented from being separated away from each other. Further, since the seal member 113 is eliminated, the number of components can be reduced.

Further, in the case where the thin film layer 31 of the first embodiment is directly stuck to the first case 11 or the thin film layer 31 is integrally molded with the first case 11, the circular member 32 can be eliminated. In such a configuration, a part of the first case serves as the holder to form a holding space 34 between the thin film layer 31 and the diaphragm 22.

Figure 9:
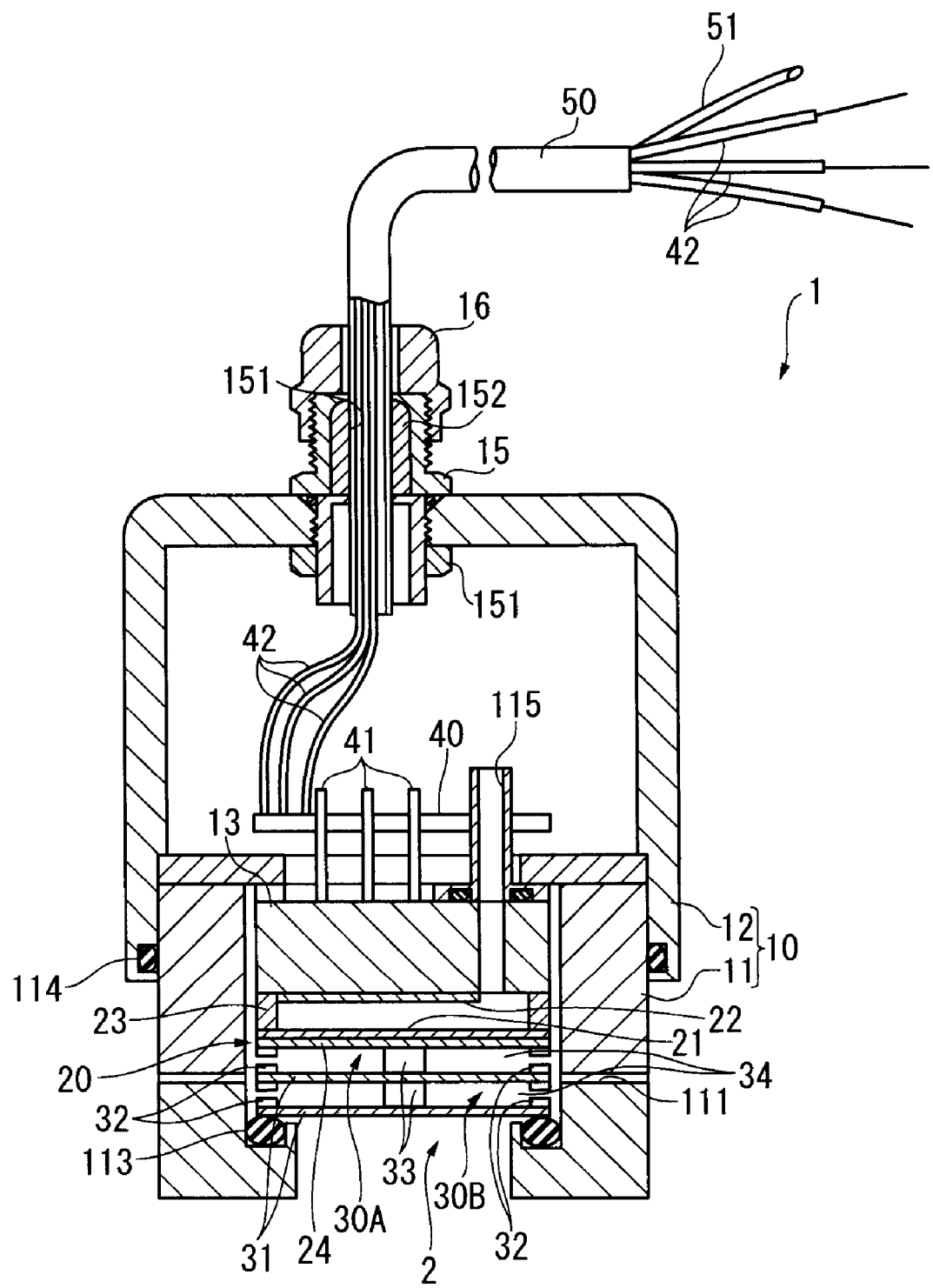
FIG. 9 is a cross section showing a pressure transmitter of yet another embodiment of the present invention.

Although, in the above embodiments, there is one pressure receiver 30 provided on the opening 10A side of the pressure sensor element 20, the configuration also can be the one shown in FIG. 9. As shown in FIG. 9, a first pressure receiver 30A is provided on the opening 10A side of the pressure sensor element 20, and a second pressure receiver 30B is provided on the opening 10A side of the first pressure receiver 30A. By providing plural pressure receivers, the corrosive gas component originated from the fluid to be measured can be securely prevented from permeating, and thereby the diaphragm 22 can be securely prevented from being corroded.

Further, as mentioned above, a pump can be connected to the communication hole 111, so that the ventilation of the holding space 34 can be effectively performed.

Although, in the second embodiment, each of the curved portion 721 of the lot 72 and the curved portion 731 of the projection curves and extends while drawing a circular arc of the predetermined radius R, the present invention is not limited thereto. That is, the curved portion 721 and the curved portion 731 do not have to draw a circular arc, as long as they curve. As long as the curved portion 721 and the curved portion 731 are curvedly formed, similar to the second embodiment, when the cup-shaped pressure receiving thin film 71 is displaced, the pressure can be dispersed to the curved portion 721 and the curved portion 731, thereby improving the pressure resistance.

Figure 10:
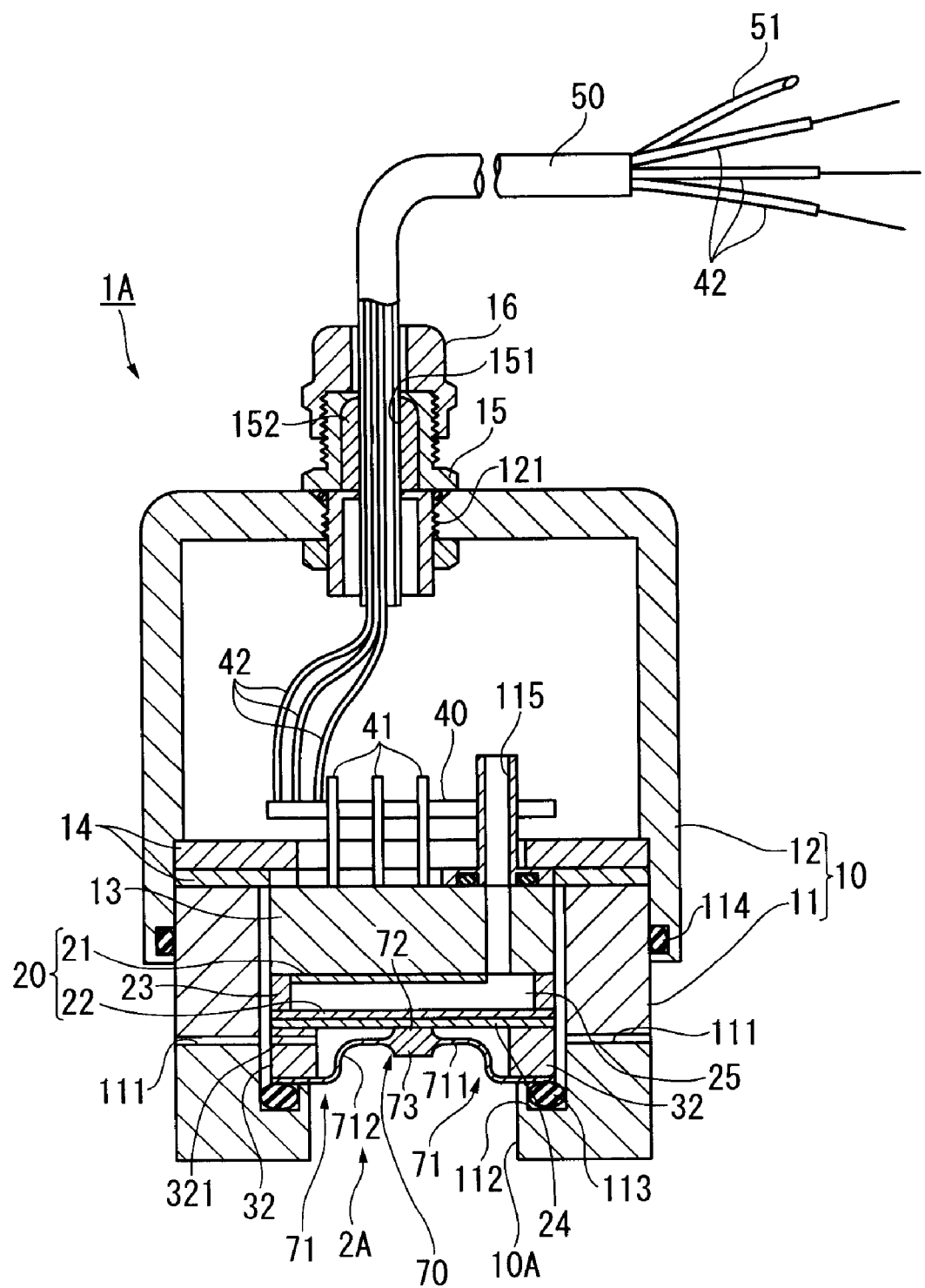
FIG. 10 is a cross section showing a pressure transmitter of yet another embodiment of the present invention.

Further, there is another alternative configuration in which the cup-shaped pressure receiving thin film 71 of the second embodiment is attached to the circular member 32 of the first embodiment. In such a configuration, as shown in FIG. 10, the circular member 32 is fixed to the outer periphery of the cylindrical portion 712 of the cup-shaped pressure receiving thin film 71 by melting press-fitting. With such a configuration, since the thin film holder 713 of the cup-shaped pressure receiving thin film 71 of the second embodiment is eliminated, the structure of the cup-shaped pressure receiving thin film 71 is simplified. Thus, the productivity of the cup-shaped pressure receiving thin film 71 can be improved.

Figure 11:
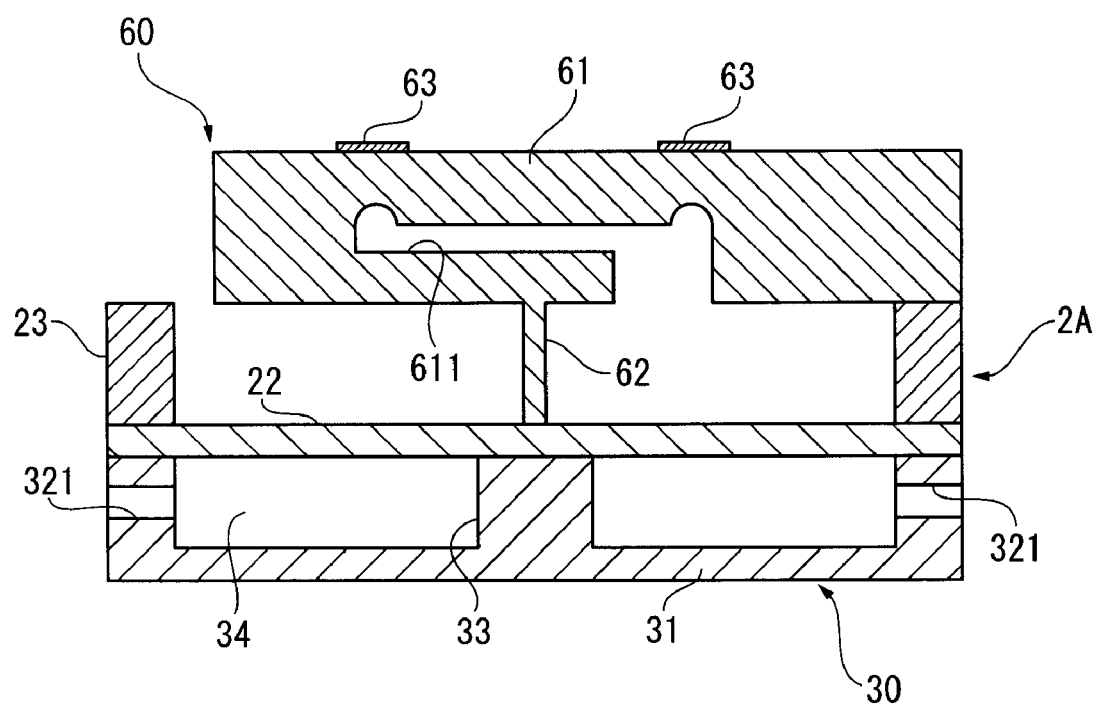
FIG. 11 is a cross section showing a pressure sensor module of yet another embodiment of the present invention.
Figure 12:
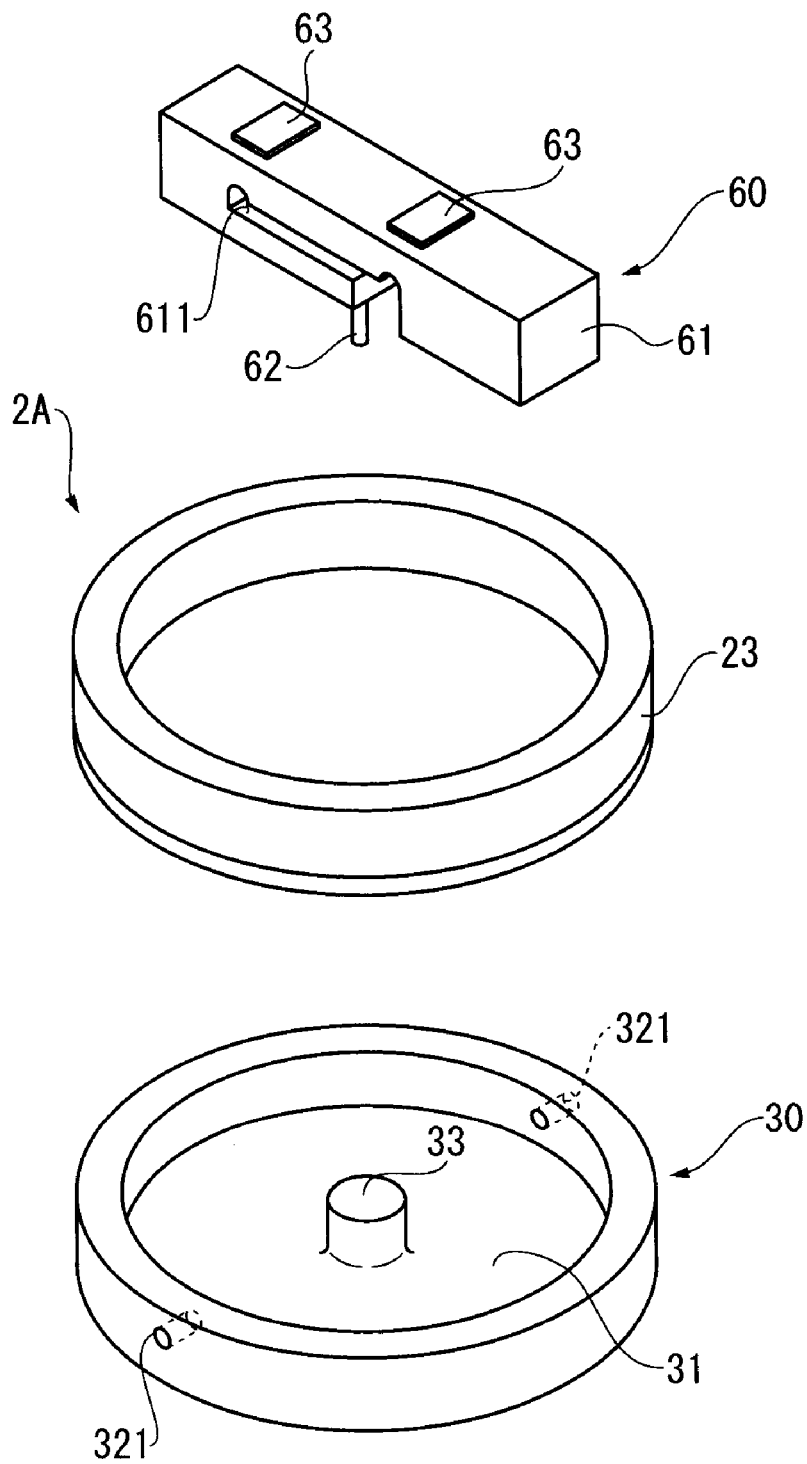
FIG. 12 is an exploded perspective view of the pressure sensor module in FIG. 11.

Although, in the first and second embodiments, the electrostatic capacitance type pressure sensor element 20 is used as the detector, the present invention is not limited thereto. For example, a resistor strain gage type pressure sensor element having the configuration shown in, for example, FIGS. 11 and 12 can be used. As shown in FIGS. 11 and 12, a pressure detector 60 is provided, via the cylindrical bonding glass 23, to a surface of the diaphragm 22 opposite to the pressure receiver 30. The pressure detector 60 includes a detector main body 61 fixed to the bonding glass 23 and a coupling portion 62 extends from the detector main body 61 toward the diaphragm 22, the coupling portion 62 transmitting the displacement of the diaphragm 22 to the detector main body 61.

The detector main body 61 has one end thereof bonded to the bonding glass 23 and the other end extended toward the axis of the bonding glass 23. The detector main body 61 is made of an elastically deformable material. When the displacement of the diaphragm 22 is transmitted through the coupling portion 62, the detector main body 61 deforms due to the displacement. The detector main body 61 is formed, substantially at the center thereof, with an elastic force holding hole 611. The elastic force holding hole 611 absorbs the displacement of the diaphragm 22 transmitted through the coupling portion 62. A strain gauge 63 (a strain detector) is provided on a surface of the detector main body 61 opposite to the diaphragm 22 side. The strain gauge 63 detects the deformation amount of the detector main body 61 when the detector main body 61 is elastically deformed. The detected deformation amount is converted into an electric signal to be outputted to a circuit board portion (not shown). The circuit board portion recognizes the strain amount of the detector main body 61 based on the inputted electric signal, and determines the displacement of the diaphragm 22 and the pressure of the fluid to be measured by arithmetic processing.

The coupling portion 62 has its tip end fixed to the center of the diaphragm 22, and transmits the displacement of the diaphragm 22 to the detector main body 61. Thus, even when the pressure of the fluid to be measured is a negative pressure and therefore the diaphragm 22 is displaced toward the side of the pressure receiver 30, the displacement of the diaphragm 22 can be correctly transmitted to the detector main body 61.

With such a configuration, since the displacement of the diaphragm 22 can be securely transmitted to the detector main body by the coupling portion 62, the pressure sensor module 2A can perfectly detect the pressure of the fluid to be measured.

Further, there is another alternative configuration in which the strain gage is directly attached to the diaphragm. With such a configuration, the strain amount caused by the displacement of the diaphragm can be directly detected by the strain gage. Thus, high detecting accuracy can be obtained. Further, since the configuration is simplified, the number of components can be reduced, thereby reducing manufacturing cost.

Note that, when being implemented, the concrete structure and procedure of the present invention can be changed to other structure and the like as long as the objects of the present invention can be achieved.

INDUSTRIAL APPLICABILITY

The present invention can be applied to a pressure sensor module and a pressure detecting device for detecting the pressure of a fluid to be measured.

The invention claimed is:

1. A pressure sensor module comprising:
a thin plate-like diaphragm displaceable by a pressure of a fluid to be measured;
a detector provided on the diaphragm and adapted to detect the displacement of the diaphragm;
a thin film layer displaceable by the pressure of the fluid to be measured, the thin film layer being arranged facing, through a holding space formed by a holder, a surface of the diaphragm opposite to a detector side of the diaphragm;
a displacement transmitter for transmitting a displacement of the thin film layer to the diaphragm; and
a vent hole that allows the holding space to communicate with the outer space.

2. The pressure sensor module according to claim 1, wherein
the holder is a circular member formed on outer peripheries of the diaphragm and of the thin film layer.

3. The pressure sensor module according to claim 2, wherein
the vent hole includes a plurality of the vent holes formed in the circular member.

4. The pressure sensor module according to claim 1, wherein
the displacement transmitter is substantially aligned with the central axis of the holding space.

5. The pressure sensor module according to claim 1, wherein
the displacement transmitter is fixed to both the diaphragm and the thin film layer.

6. The pressure sensor module according to claim 1, wherein
the thin film layer is formed substantially into a cup-shape including a bottom portion facing the diaphragm, and a cylindrical portion extending from an outer periphery of the bottom portion toward a side opposite to the diaphragm, an outer peripheral end of the cylindrical portion being fixed to the holder.

7. The pressure sensor module according to claim 6, wherein
the displacement transmitter projects from a substantially central position of the bottom portion toward the side of the diaphragm, the displacement transmitter being curved from a surface of the bottom portion to a tip end of the displacement transmitter.

8. The pressure sensor module according to claim 7, wherein
a projection is provided on a side of the bottom portion opposite to the side on which the displacement transmitter is provided, the projection being curved from a surface of the bottom portion to a tip end of the projection.

9. The pressure sensor module according to claim 8, wherein
the thin film layer, the displacement transmitter and the projection are integrally molded.

10. The pressure sensor module according to claim 1, wherein
the thin film layer, the holder and the displacement transmitter are integrally molded.

11. The pressure sensor module according to claim 1, wherein
the thin film layer is made of a fluororesin.

12. The pressure sensor module according to claim 1, wherein
a base is provided facing the detector side of the diaphragm; and
the detector includes a capacitor formed by a pair of electrodes respectively provided on the detector side of the diaphragm, and on a surface of the base facing the diaphragm.

13. The pressure sensor module according to claim 1, wherein
the detector is a strain detector for detecting a strain caused by the displacement of the diaphragm.

14. The pressure sensor module according to claim 13, wherein the strain detector is provided on an elastically deformable detector main body spaced apart from the diaphragm by a predetermined distance and connected to the diaphragm with a coupling portion.

15. The pressure sensor module according to claim 14, wherein
the strain detector abuts on the diaphragm.

16. The pressure sensor module according to claim 1, wherein
a thin film is stuck to a surface of the diaphragm on a side of the thin film layer.

17. A pressure detecting device comprising:
a pressure sensor module; and
a case for housing the pressure sensor module, the case having an opening formed in a manner that a surface of the thin film layer opposite to the diaphragm faces an outside from the opening,
wherein the pressure sensor module includes:
  a thin plate-like diaphragm displaceable by a pressure of a fluid to be measured;
  a detector provided on the diaphragm and adapted to detect the displacement of the diaphragm;
  a thin film layer displaceable by the pressure of the fluid to be measured, the thin film layer being arranged facing, through a holding space formed by a holder, a surface of the diaphragm opposite to a detector side of the diaphragm;
  a displacement transmitter for transmitting a displacement of the thin film layer to the diaphragm; and
  a vent hole that allows the holding space to communicate with the outer space.

18. The pressure detecting device according to claim 17, wherein
the case is provided with, in a part thereof, the holder to fix the outer periphery of the thin film layer, so that the holding space is formed between the diaphragm and the thin film layer.

19. The pressure detecting device according to claim 18, wherein
the case includes an upper case provided on a side of the thin film layer on the side of the diaphragm and a lower case provided on a side of the thin film layer opposite to the diaphragm; and
the thin film layer is sandwiched and fixed between the upper case and the lower case.

20. The pressure detecting device according to claim 19, wherein
at least one of the upper case and the lower case includes a fixing groove on at least a part of the position where the thin film layer is fixed; and
the thin film layer includes a fixing projection to be fitted into the fixing groove on the outer periphery thereof, the thin film layer being sandwiched and fixed between the upper case and the lower case when the fixing projection is fitted into the fixing groove.

* * * * *